United States Patent
Narendra et al.

(10) Patent No.: US 8,843,062 B2
(45) Date of Patent: Sep. 23, 2014

(54) COUPLING AREA ENHANCEMENT APPARATUS, SYSTEM, AND METHOD

(75) Inventors: Siva G. Narendra, Portland, OR (US); Saurav Chakraborty, West Bengal (IN)

(73) Assignee: Tyfone, Inc., Portland, OR (US)

( * ) Notice: Subject to any disclaimer, the term of this patent is extended or adjusted under 35 U.S.C. 154(b) by 816 days.

(21) Appl. No.: 13/097,167

(22) Filed: Apr. 29, 2011

(65) Prior Publication Data

US 2012/0276963 A1    Nov. 1, 2012

(51) Int. Cl.
*H04B 5/00*    (2006.01)
*G06K 7/10*    (2006.01)
*H01Q 1/48*    (2006.01)
*H01Q 7/00*    (2006.01)

(52) U.S. Cl.
CPC .............. *H01Q 7/00* (2013.01); *G06K 7/10178* (2013.01); *H01Q 1/48* (2013.01)
USPC .... 455/41.1; 455/556.1; 455/557; 455/575.1; 455/575.7; 340/13.24; 340/13.26; 340/854.6; 340/854.8; 340/855.1; 340/568.1; 340/572.1; 343/856; 343/857

(58) Field of Classification Search
USPC .............. 455/41.1, 41.2, 550.1, 556.1, 556.2, 455/557, 558, 575.1, 575.7, 575.8; 340/13.24, 13.26, 854.6, 854.8, 854.9, 340/855.1, 568.1, 572.1, 572.7; 343/856, 343/857
See application file for complete search history.

(56) References Cited

U.S. PATENT DOCUMENTS

| | | | | |
|---|---|---|---|---|
| 5,535,439 | A * | 7/1996 | Katz | 455/117 |
| 7,518,518 | B2 * | 4/2009 | Homanfar et al. | 340/572.1 |
| 7,890,053 | B2 * | 2/2011 | Washiro | 455/41.1 |
| 8,095,073 | B2 * | 1/2012 | Hayes et al. | 455/63.1 |
| 8,422,973 | B2 * | 4/2013 | Takarada | 455/274 |
| 8,437,695 | B2 * | 5/2013 | Chatterjee et al. | 455/41.1 |
| 8,554,136 | B2 * | 10/2013 | McCormack | 455/41.1 |
| 2007/0060221 | A1 * | 3/2007 | Burgan et al. | 455/575.7 |
| 2009/0052618 | A1 * | 2/2009 | Homanfar et al. | 378/38 |

* cited by examiner

*Primary Examiner* — Tuan A Tran
(74) *Attorney, Agent, or Firm* — Dana B. LeMoine; LeMoine Patent Services, PLLC

(57) ABSTRACT

A coupling area enhancement device includes a small coil and a large coil on opposing sides of a sheet of electromagnetic interference (EMI) absorptive material. The coupling area enhancement device may include one or more holes and may include adhesive material and sticker covers. Placement of the coupling area enhancement device may be accomplished by sticking the small coil to a host device near a contactless antenna. The large coil may also be stuck to a battery cover.

23 Claims, 9 Drawing Sheets

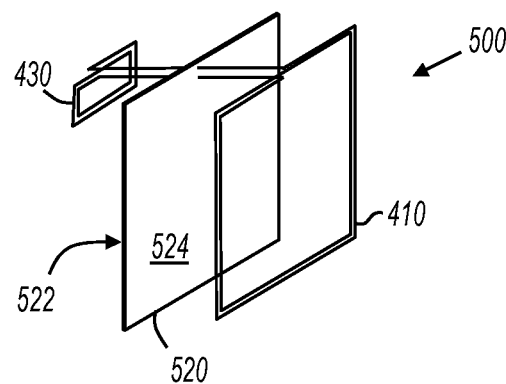
*FIG. 5*
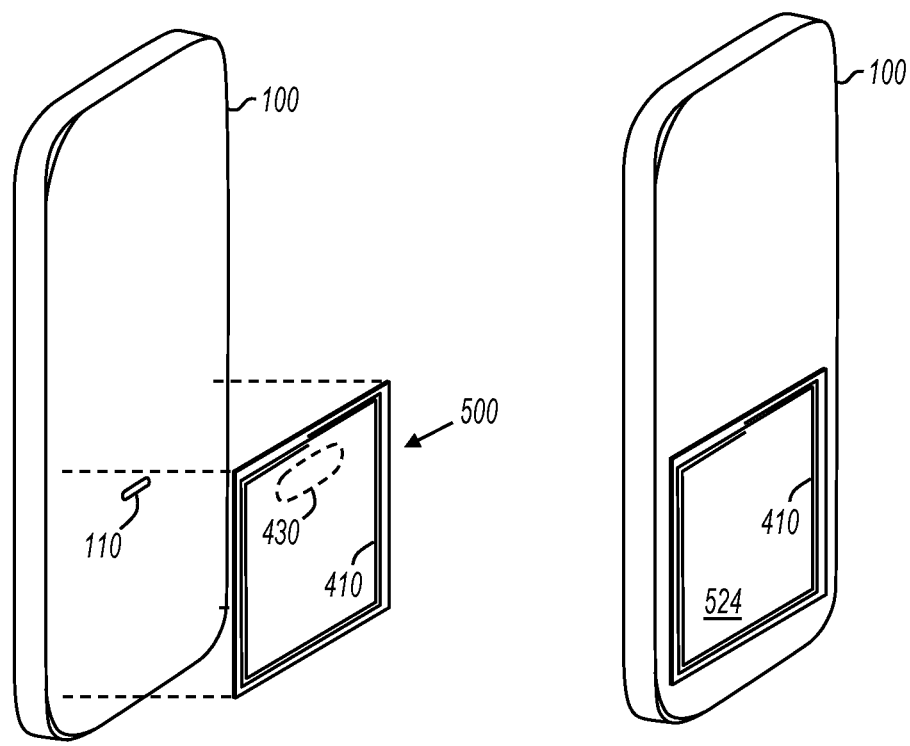
*FIG. 6A*  *FIG. 6B*

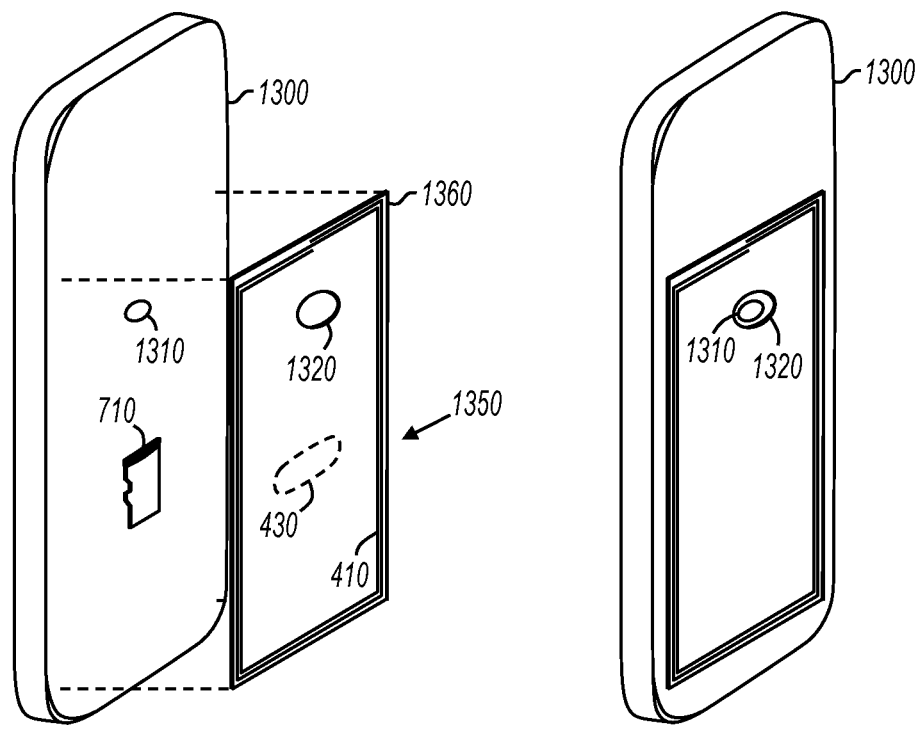
*FIG. 13A*  *FIG. 13B*
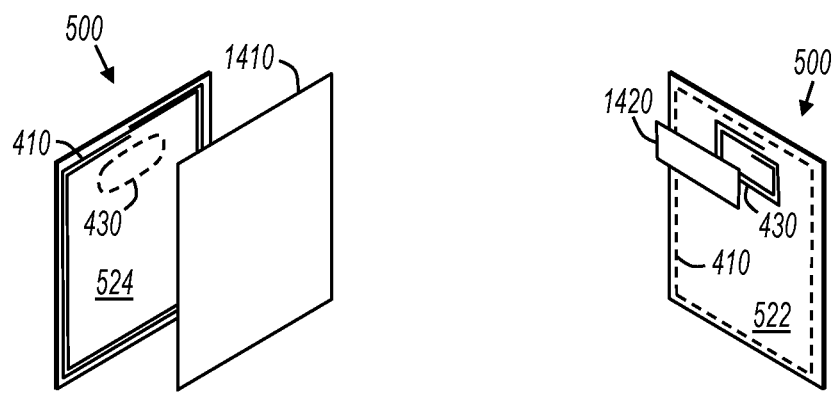
*FIG. 14A*  *FIG. 14B*

COUPLING AREA ENHANCEMENT APPARATUS, SYSTEM, AND METHOD

FIELD

The present invention relates generally to transformer coupling, and more specifically to the enhancement of coupling area.

BACKGROUND

Small coils are being used as antennas for near field communications (NFC). For example, mobile phones are incorporating contactless smartcard circuits to read tags and communicate with readers in mobile payment applications. FIG. 1 shows a prior art mobile device 100 with a small coil 110 coupling to a large coil 120 in a reader device. FIG. 2 shows a prior art transformer representation of the coils of FIG. 1. When in the near field, coils 110 and 120 couple as transformer windings as shown in FIG. 2. Because coil 110 is small, it presents a small coupling area as compared to reader coil 120, and transformer coupling is not very efficient. As a result, the mobile device generally needs to be placed very close to a reader device in order to effect communications.

FIG. 3 shows a prior art back-to-back transformer. Back-to-back transformers are typically used for line isolation. See Darren Ashbey et al., Circuit Design:Know It All 199-200 (2008).

BRIEF DESCRIPTION OF THE DRAWINGS

FIG. 5 shows an exploded view of a coupling area enhancer in accordance with various embodiments of the present invention;

FIGS. 6A, 6B, 7A, and 7B show placement of coupling area enhancement devices on mobile devices in accordance with various embodiments of the present invention;

FIGS. 13A and 13B show placement of a coupling area enhancement device on a mobile device in accordance with various embodiments of the present invention;

FIGS. 14A and 14B show two sides of a coupling area enhancement device with stickers and adhesive;

DESCRIPTION OF EMBODIMENTS

Figure 1:
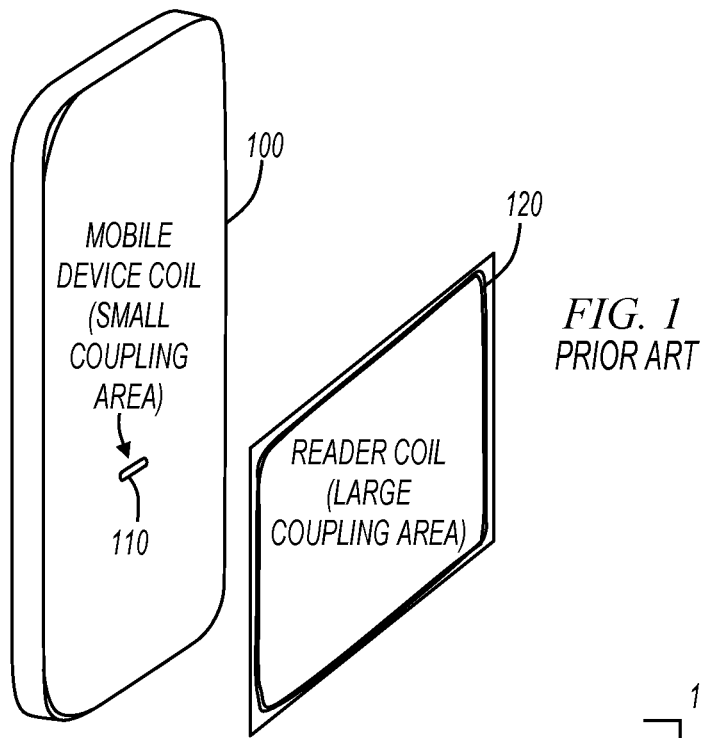
FIG. 1 shows a prior art mobile device with a small coil coupling to a large coil in a reader device.
Figure 2:
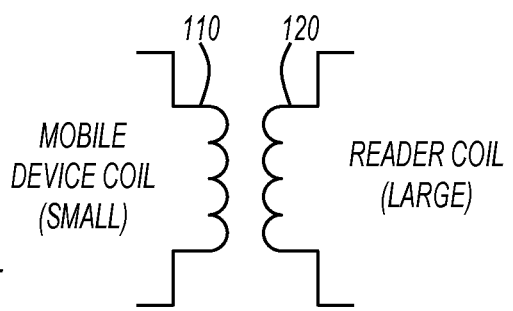
FIG. 2 shows a prior art transformer representation of the coils of FIG. 1.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 4A:
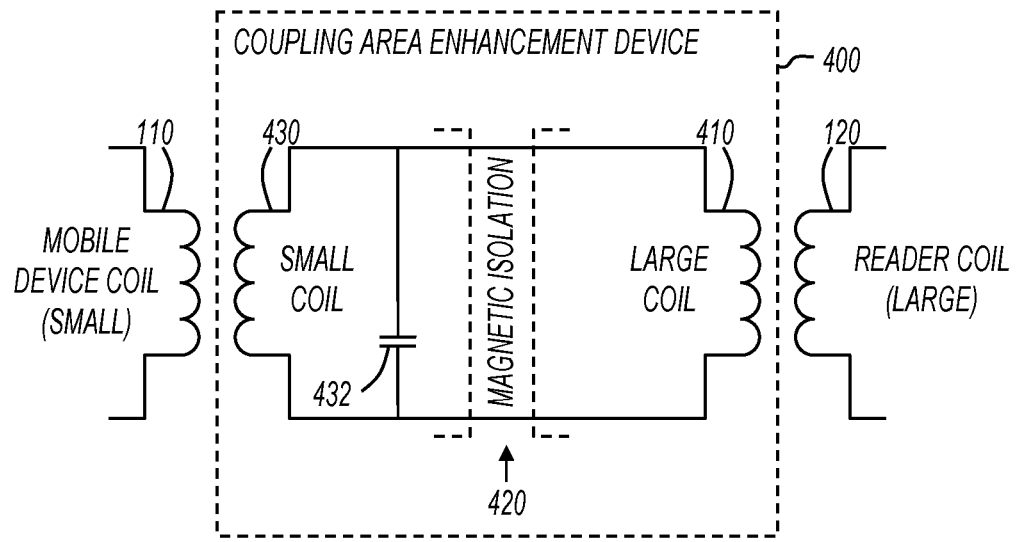
FIGS. 4A and 4B show coupling area enhancement devices in accordance with various embodiments of the present invention.
Figure 4B:
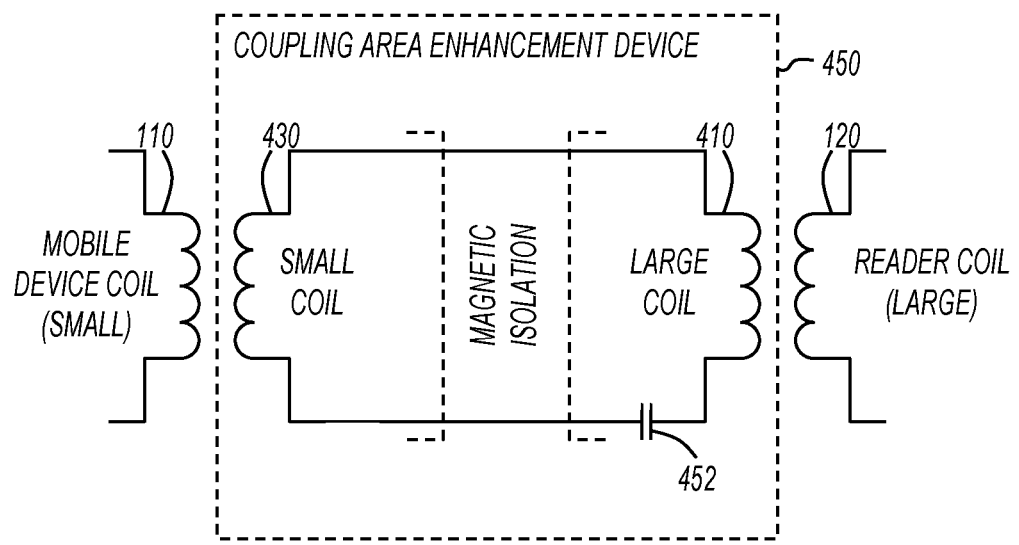

FIGS. 4A and 4B show coupling area enhancement devices in accordance with various embodiments of the present invention. As shown in FIG. 4A, coupling area enhancement device 400 includes small coil 430, tuning capacitor 432, magnetic isolation 420, and large coil 410. FIG. 4A also shows mobile device coil 110 and reader coil 120.

Small coil 430 is sized to approximately match the size of mobile device coil 110 to increase coupling to the mobile device coil as compared to the coupling achieved in the prior art system of FIG. 1. Large coil 410 is larger than either mobile device coil 110 or small coil 430. This increases the coupling to reader coil 120.

Magnetic isolation 420 is provided to ensure that any surrounding metal does not render large coil 410 ineffective when coupling area enhancement device 400 is attached to a mobile device. In some embodiments, magnetic isolation 420 is provided using an electromagnetic interference (EMI) absorptive material. One example is FerroxFoil from Ferrox-Cube International Holding B.V. of Eindhoven, The Netherlands.

Figure 3:
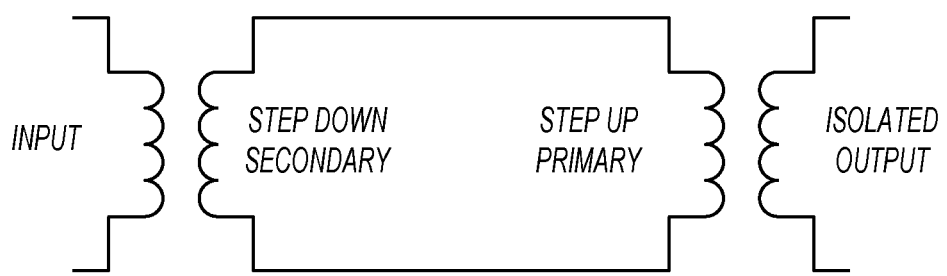
FIG. 3 shows a prior art back-to-back transformer.

In the prior art of back-to-back transformers (FIG. 3), the step down secondary and the step up primary are not magnetically isolated.

Small coil 430 and large coil 410 are connected by conductors (electrically coupled) as shown in FIG. 4A. Parallel tuning capacitor 432 is added to tune the circuit to be resonant at a particular frequency. For example, in some embodiments, coupling area enhancement device 400 is tuned to operate at 13.56 MHz, a common frequency for contactless communications. Also for example, in some embodiments, the EMI absorptive material absorbs energy at the frequency to which the coils are tuned (e.g., 13.56 MHz).

In the embodiments represented by FIG. 4B, small coil 430 and large coil 410 are electrically coupled with a series tuning capacitor 452. Any combination of parallel and/or series circuit elements may be incorporate in coupling area enhancement devices without departing from the scope of the present invention. The choice and placement of tuning elements may depend in part on what frequency range needs to be passed and/or stopped.

FIG. 5 shows an exploded view of a coupling area enhancement device in accordance with various embodiments of the present invention. Coupling area enhancement device 500 may include any of the circuits shown above in FIGS. 4A and/or 4B. For example, coupling area enhancement device 500 is shown with small coil 430, large coil 410, and EMI absorptive material 520. EMI absorptive material 520 functions as magnetic isolation 420 (FIG. 4). Coils 410 and 430 are shown electrically coupled through EMI absorptive material 520. Series and/or parallel tuning elements may be included (not shown).

Structurally, small coil 430 is on a first side 522 of EMI absorptive material 520, and large coil 410 is on a second side 524 of EMI absorptive material 520. In some embodiments, EMI absorptive material is a flexible sheet, and coils 430 and 410 flex with the sheet. Tuning capacitors and their connections may be on any side or combination of sides. EMI absorptive material 520 may be any shape, and may have holes or indentations to accommodate uneven surfaces when attached to a mobile device.

In operation, small coil 430 magnetically couples with a small coil on a mobile device, such as coil 110 (FIG. 1). Substantial coupling takes place as long as the two coils are aligned, because the two coils are not greatly mismatched in size. Large coil 410 is connected to the small coil 430 through the electrical coupling described above, and then large coil 410 magnetically couples to a coil on a reader device. Through this operation, an increased coupling area (that of large coil 410) is presented to a reader. Hence, the device is referred to as a coupling area enhancement device.

FIGS. 6A, 6B, 7A, and 7B show placement of coupling area enhancement devices on mobile devices in accordance with various embodiments of the present invention.

FIG. 6A shows coupling area enhancement device 500 aligned such that small coil 430 will be placed over mobile device coil 110 when attached. When attached to mobile device 100 (FIG. 6B), coupling area enhancement device 500 has side 522 with small coil 430 facing the mobile device. Side 524 is facing out with large coil 410 exposed for coupling to a reader.

In some embodiments, mobile device 100 includes a contactless device along with small coil 110 to effect communications. For example, mobile device 100 may be a mobile phone or tablet computer with a dual interface smartcard chip or a near-field communications (NFC) chip coupled to coil 110. In other embodiments, coil 110 is provided in mobile device 100, and a contactless device is included in an add-on card such as a memory card or subscriber identity module (SIM).

In some embodiments, an adhesive is applied to a portion, or all, of side 522 prior to attaching coupling area enhancement device 500 to mobile device 100.

When small coil 430 is aligned with the mobile device small coil 110, the effective area for coupling to the reader is now increased to a larger area compared to the prior art shown in FIG. 1. This allows for an enhanced consumer experience in part because the consumer does not have to tap or swipe a specific area of the mobile device to the reader.

Figures 7A, 7B:
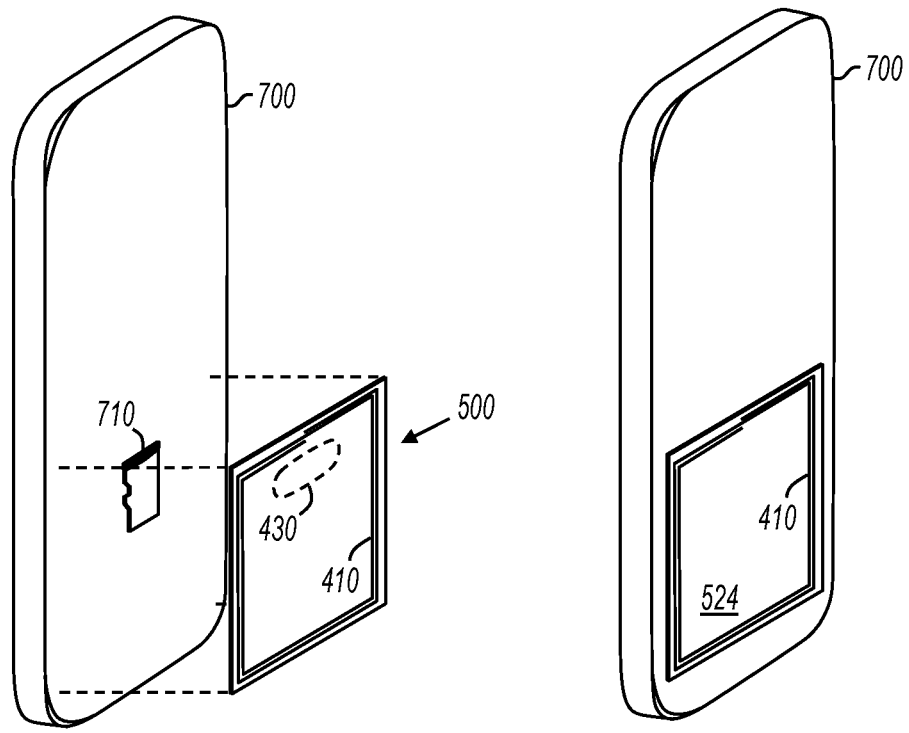

FIG. 7A shows coupling area enhancement device 500 aligned with mobile device 700 such that small coil 430 will be placed over all or a portion of add-on card 710. In some embodiments, add-on card 710 is a memory card that includes a contactless device with a loop antenna. Further, in some embodiments, add-on card 710 is a subscriber identity module (SIM) card with a contactless device and loop antenna. For example, the contactless device may include a dual interface smartcard chip or a near-field communications (NFC) chip, and the loop antenna may be a small wire loop wound around a magnetic material.

Although add-on card 710 is shown on the back of mobile device 700, the location of the add-on card or the need for the add-on card to be present to provide the described functionality is not a limitation of the present invention. Add-on card 710 may be anywhere on or in mobile device 700. For example, in some embodiments, add-on card 710 is a MicroSD memory card that is in a memory card slot of a mobile phone or tablet computer. Also for example, in some embodiments, add-on card 710 may be a memory card or SIM card stored behind a battery cover of a mobile phone or tablet computer. Also for example, in some embodiment, all of the pertinent functions of the add-on card 710 may be embedded directly in the mobile device.

When attached to mobile device 700 (FIG. 7B), coupling area enhancement device 500 has side 522 with small coil 430 facing the mobile device. Side 524 is facing out with large coil 410 exposed for coupling to a reader.

Mobile device 700 (and mobile device 100) may be any type of mobile device. For example, mobile device 700 may be a mobile phone, a portable media player, a tablet computer, a sleeve that accepts another mobile device, or the like. The various embodiments of coupling area enhancement devices may be used to enhance the coupling area of any type of device without departing from the scope of the present invention.

Figure 8:
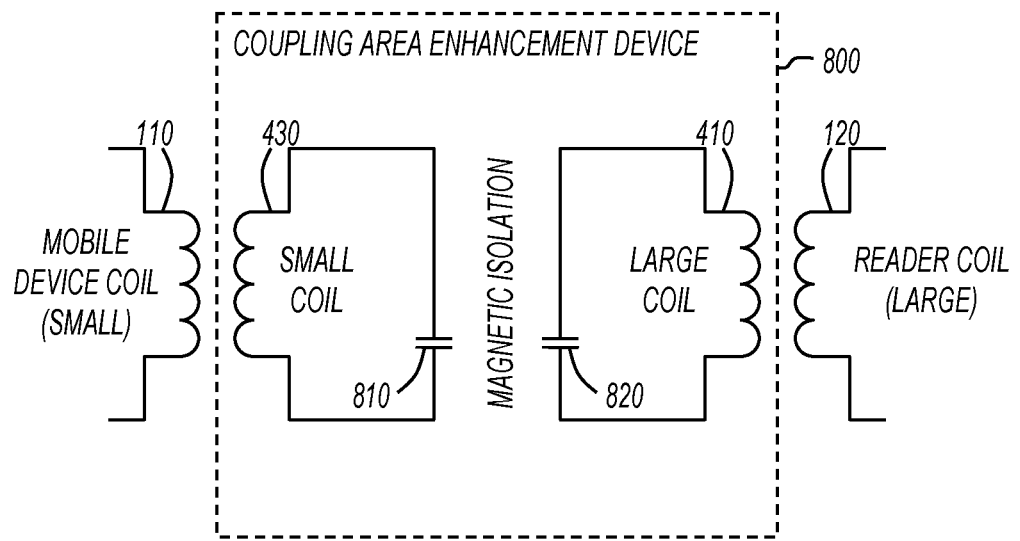
FIG. 8 shows a coupling area enhancement device having magnetic coupling between small and large coils.

FIG. 8 shows a coupling area enhancement device having magnetic coupling between small and large coils. Coupling area enhancement device 800 includes small coil 430 and tuning capacitor 810 on one side of the magnetic isolation. Coupling area enhancement device 800 also includes large coil 410 and tuning capacitor 820 on a second side of the magnetic isolation.

In embodiments represented by FIG. 8, small coil 430 is tuned with capacitor 810 and large coil 410 is tuned separately with capacitor 820. The two coils couple to each other through the magnetic isolation EMI absorber (magnetic coupling), which acts like the core of a transformer, except in this case each of the coils are tuned to a specific frequency range of interest.

Any of the coupling area enhancement devices described herein may be magnetically coupled as shown in FIG. 8, or electrically coupled as shown in FIGS. 4A and 4B.

Figure 9:
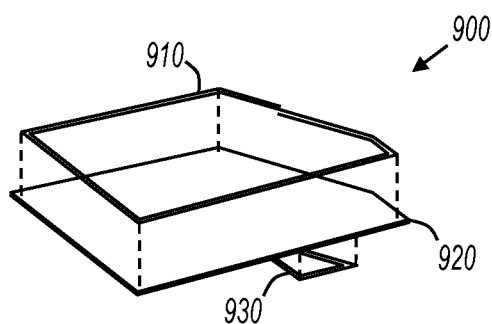
FIGS. 9-11 show coupling area enhancement devices with various coil shapes and placements.
Figure 10:
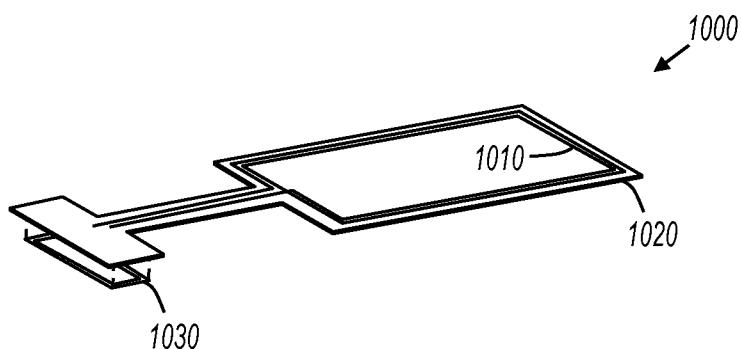
Figure 11:
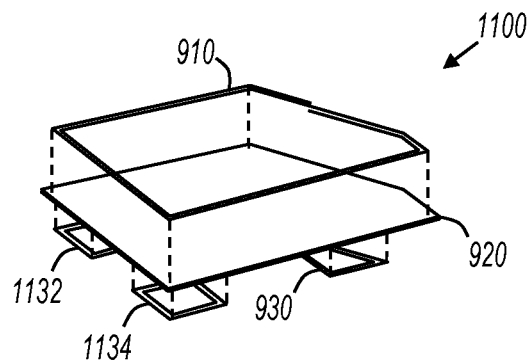

FIGS. 9-11 show coupling area enhancement devices with various coil shapes and placements. FIG. 9 shows coupling area enhancement device 900 with EMI absorptive sheet 920, large coil 910, and small coil 930. The shape of the coupling area enhancement devices or the coils need not be rectangular or a square. For example, as shown in FIG. 9, the EMI absorptive sheet is an irregular shape, as are the coils. Further, the various embodiments of the invention are not limited by the relative position of the small coil to the large coil. For example, in some embodiments, the small coil is located in a corner or along one side. Because different mobile devices may have coils in various different locations, the small coil may be located anywhere on the EMI absorptive sheet so that it may couple to mobile device coil.

FIG. 10 shows another coupling area enhancement device 1000. Coupling area enhancement device 1000 includes EMI absorptive material 1020, small coil 1030, and large coil 1010. Small coil 1030 is located at the end of an appendage of EMI absorptive material 1020. In some embodiments, this is useful when the mobile device coil is not located in a spot that can easily or ergonomically accommodate the entire coupling area enhancement device. For example, the mobile device coil may be along side a touchscreen, under a keyboard, or the like.

FIG. 11 show another coupling area enhancement device 1100. Coupling area enhancement device 1100 includes large coil 910, EMI absorptive sheet 920, and small coil 930. Coupling area enhancement circuit 1100 also includes additional small coils 1132 and 1134. As shown in FIG. 11, some embodiments of coupling area enhancement devices include more than one small coil. One of the small coils may be used to couple to a coil on a mobile device. Or one small coil may couple to one add-on card and a second small coil may couple to another add-on card or directly to a small coil on the mobile device. Similarly, some embodiments include multiple large coils for one small coil or for multiple small coils.

Figure 12A:
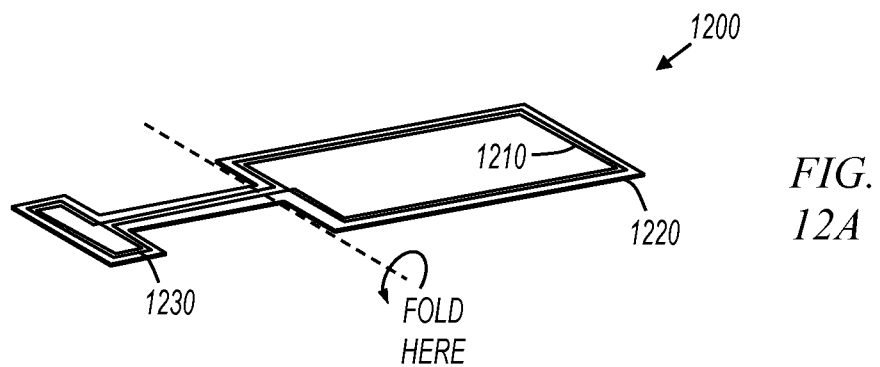
FIGS. 12A and 12B show a coupling area enhancement device with a flexible substrate.
Figure 12B:
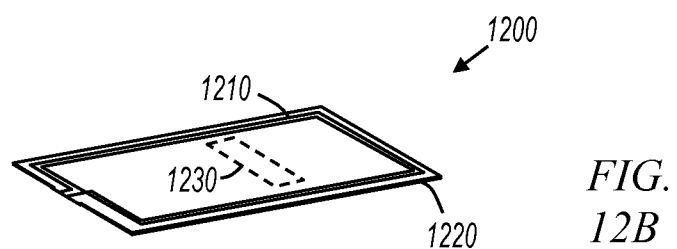

FIGS. 12A and 12B show a coupling area enhancement device with a flexible substrate. Coupling area enhancement device 1200 includes flexible EMI absorptive sheet 1220 (the substrate), large coil 1210, and small coil 1230. As shown in FIG. 12A, small coil 1230 and large coil 1210 may be on the same side of the flexible EMI absorptive sheet but apart from each other when manufactured. As shown in FIG. 12B, the flexible EMI absorptive sheet may be folded such that the flexible substrate creates a structure with small coil 1230 and large coil 1210 on opposing sides. The folding may occur prior to, or concurrently with, installing in the mobile device.

FIGS. 13A and 13B show placement of a coupling area enhancement device on a mobile device in accordance with various embodiments of the present invention. Mobile device 1300 includes add-on card 710 and accessory device 1310. Coupling area enhancement device 1350 includes large coil 410, small coil 430, and EMI absorptive sheet 1360 with hole 1320.

As shown in FIG. 13B, hole 1320 aligns with accessory device 1310 when coupling area enhancement device 1350 is attached. Accessory device 1310 may be any type of device that can advantageously be aligned with hole 1320. For example, accessory device 1310 may be a speaker, microphone, light sensor, display, camera, or the like. Any number of accessory devices may be accommodated by any number holes, indentations, protrusion, or the like within any of the coupling area enhancement devices described herein.

FIGS. 14A and 14B show two sides of a coupling area enhancement device with stickers and adhesive. FIG. 14A shows an exploded view of coupling area enhancement device 500 and sticker cover 1410. Sticker cover 1410 covers all or a portion of face 524. In some embodiments, adhesive is applied to either or both of face 524 and sticker cover 1410 before applying sticker cover 1410 to face 524. When sticker cover 1410 is removed from face 524, the adhesive remains and face 524 will adhere to any surface that is pressed against it.

FIG. 14B shows an exploded view of coupling area enhancement device 500 and sticker cover 1420. Sticker cover 1420 covers all or a portion of face 522. In some embodiments, adhesive is applied to either or both of face 522 and sticker cover 1420 before applying sticker cover 1420 to face 522. When sticker cover 1420 is removed from face 522, the adhesive remains and face 522 will adhere to any surface that is pressed against it.

In some embodiments, sticker covers 1410 and 1420 are different sizes. For example, sticker cover 1420 may be roughly the same size as coil 430 or may be much smaller. Also for example, sticker cover 1410 may be quite large such that most if not all of face 524 has exposed adhesive when cover 1410 is removed. As described further below, the different sizes of sticker covers may aid in the placement of the coupling area enhancement device relative to a small coil in a mobile device. Some embodiments include multiple sticker covers on one or both faces.

In some embodiments, adhesive and sticker covers are only placed on one side of the EMI absorptive material. For example, referring now back to FIG. 12, a small sticker cover may be placed over small coil 1230, and a larger sticker cover may be placed over large coil 1210.

Figure 15:
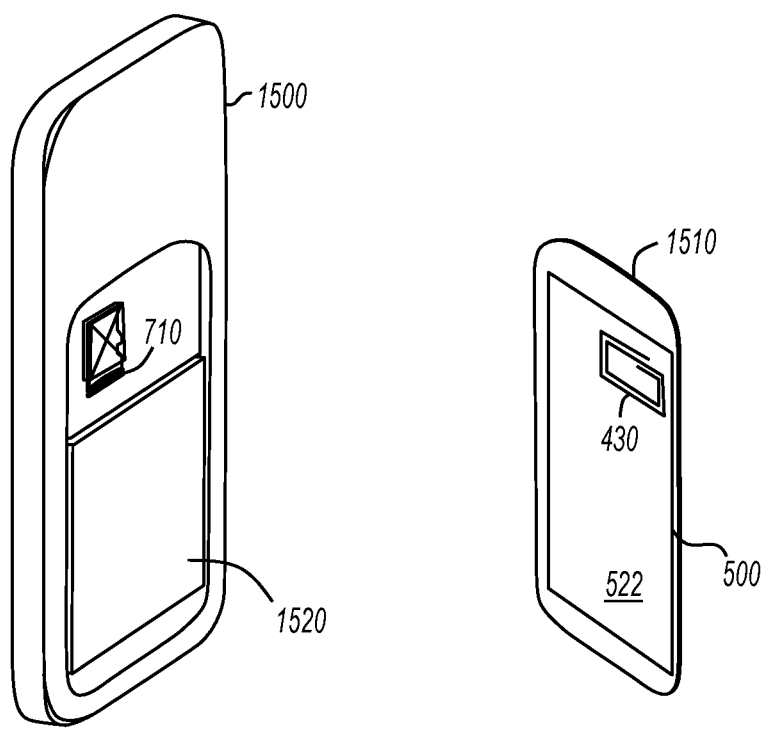
FIG. 15 shows placement of a coupling area enhancement device inside a battery cover.

FIG. 15 shows placement of a coupling area enhancement device inside a battery cover. Mobile device 1500 is shown with battery cover 1510 removed. With battery cover 1510 removed, battery 1520 and add-on card 710 are exposed. Coupling area enhancement device 500 has been adhered to the inside of battery cover 1510 and has been oriented such that face 522 is exposed and small coil 430 aligns with a loop antenna in add-on card 710. When battery cover 1510 is replaced on mobile device 1500 with coupling area enhancement device 500 placed and oriented as shown, the coupling area of add-on card 710 is substantially enhanced.

In some embodiments, coupling area enhancement device 500 is adhered directly to battery cover 1510 by peeling off sticker cover 1410 (FIG. 14) and pressing it to the battery cover. In other embodiments, sticker cover 1420 is first peeled off and coupling area enhancement device 500 stuck to add-on card to better align the add-on card with small coil 430. Sticker cover 1410 is then peeled off and battery cover 1510 is replaced. This is described in more detail below with reference to FIG. 16.

Figure 16:
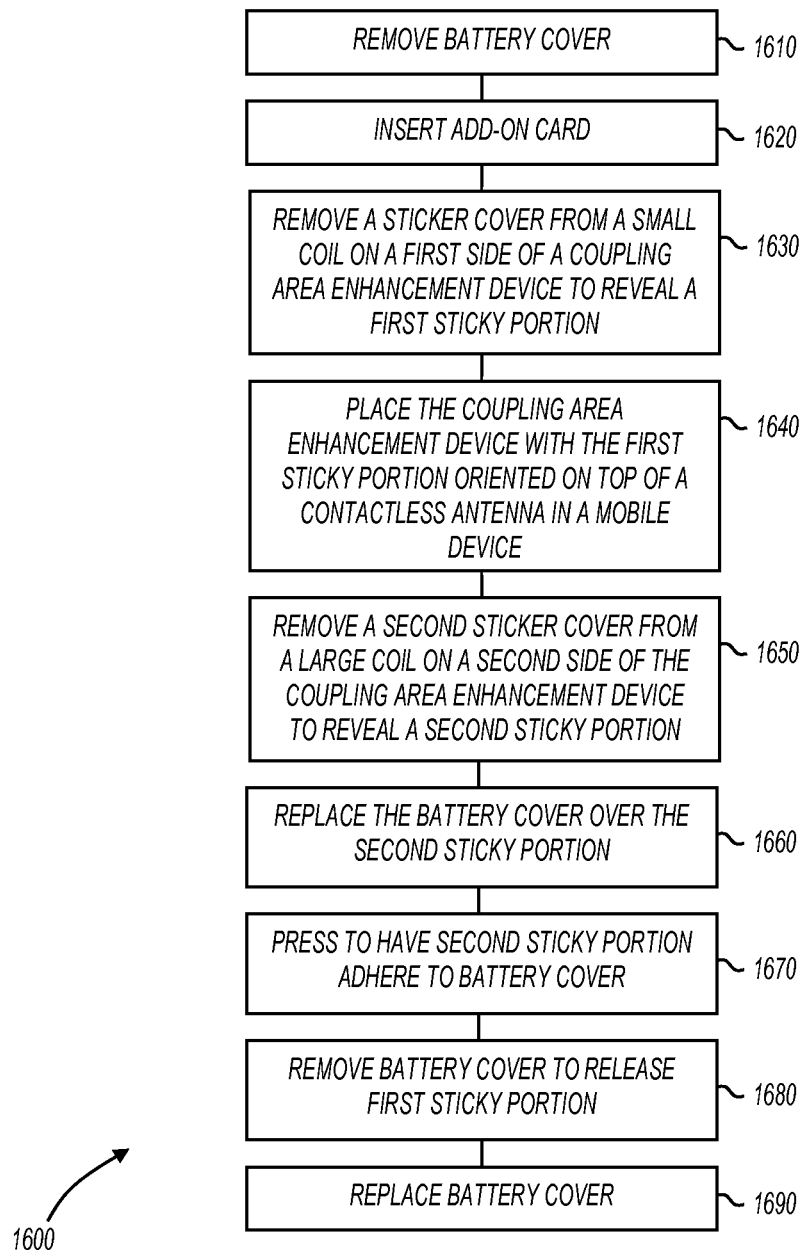
FIG. 16 shows a flowchart of methods in accordance with various embodiments of the present invention.

FIG. 16 shows a flowchart of methods in accordance with various embodiments of the present invention. In some embodiments, method 1600 may be performed when orienting a coupling area enhancement device relative to a small coil on a mobile device. The various actions in method 1600 may be performed in the order presented, in a different order, or simultaneously. Further, in some embodiments, some actions listed in FIG. 16 are omitted from method 1600.

Method 1600 begins at 1610 in which a battery cover is removed from a mobile device. This corresponds to battery cover 1510 being removed from mobile device 1500. In some embodiments, the battery cover is not removed. For example, mobile device 1500 may have an add-on card slot in the front or one of the perimeter sides. At 1620, an add-on card is inserted. This corresponds to inserting add-on card 710 into mobile device 1500. In some embodiments, an add-on card is not inserted. For example, mobile device 1500 may already include a coil or loop antenna.

At 1630, a sticker cover is removed from a small coil on a first side of the coupling area enhancement device to reveal a small sticky portion. This corresponds to removing sticker cover 1420 to reveal a sticky portion covering small coil 430. In some embodiments, multiple small coils exist and multiple sticker covers exist. For example, a single coupling area enhancement device may be used for multiple different types of mobile devices with coils in different locations. Also for example, a mobile device may have more than one coil. In these embodiments, which sticker to be removed is dictated by the location of the coil.

In the case of add-on cards and microSD cards, the contactless antenna will often be the only exposed edge of the card once it is inserted. In the case of the contactless antenna being built-in to the mobile device, it may be anywhere and marked.

At 1640, the coupling area enhancement device is placed with the first sticky portion oriented on top of a contactless antenna in a mobile device. This corresponds to coupling area enhancement device 500 being placed against mobile device 1500 with battery cover 1510 removed such that coil 430 aligns with an antenna in add-on card 710.

At 1650, a second sticker cover is removed from a large coil on a second side of the coupling area enhancement device to reveal a second sticky portion. This corresponds to removing sticker cover 1410 from face 524. At this point in method 1600, coupling area enhancement device 500 is attached to mobile device 1500 with an adhesive surface exposed and the battery cover removed.

At 1660, the battery cover is replaced over the second sticky portion, and at 1670, the battery cover is pressed in place to have the second sticky portion adhere to the battery cover.

Once the coupling area enhancement device is stuck on the battery cover, pulling the battery cover at 1680 will release the first sticky portion since the surface area of the second sticky portion is greater than the surface area of the first sticky portion. In some embodiments, different types of adhesives are used on the two sides of the coupling area enhancement device to aid in the release of the first sticky portion when the battery cover is removed.

At this point in method 1600, coupling area enhancement device 500 is adhered to battery cover 1510 and aligned such that small coil 430 aligns with a contactless antenna in add-on card 710. At 1690, the battery cover is replaced.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A coupling area enhancement device comprising:
   a sheet of electromagnetic interference (EMI) absorptive material;
   a first coil on a first side of the sheet of EMI absorptive material; and
   a second coil on a second side of the sheet of EMI absorptive material, wherein the second coil is coupled to the first coil, and the second coil is larger than the first coil.

2. The coupling area enhancement device of claim 1 wherein the first coil is electrically coupled to the second coil.

3. The coupling area enhancement device of claim 1 wherein the first coil is magnetically coupled to the second coil.

4. The coupling area enhancement device of claim 1 wherein the sheet of EMI absorptive material includes at least one hole.

5. The coupling area enhancement device of claim 1 wherein the first coil is located at one corner of the sheet of EMI absorptive material.

6. The coupling area enhancement device of claim 1 wherein the first coil is located at one edge of the sheet of EMI absorptive material.

7. The coupling area enhancement device of claim 1 further comprising a plurality of small coils on the first side.

8. The coupling area enhancement device of claim 1 further comprising adhesive material on the first side of the sheet of EMI absorptive material.

9. The coupling area enhancement device of claim 8 wherein the adhesive material is placed to adhere a portion of the coupling area enhancement device corresponding to the first coil to a coupling area of a separate device.

10. The coupling area enhancement device of claim 9 further comprising additional adhesive material on the second side of the sheet of EMI absorptive material, wherein an area of the additional adhesive material on the second side is larger than an area of the adhesive material on the first side.

11. A coupling area enhancement device comprising:
    a flexible substrate with electromagnetic interference (EMI) absorptive qualities;
    a first coil on a first side of the flexible substrate; and
    a second coil on the first side of the flexible substrate, wherein the second coil is electrically coupled to the first coil, and the second coil is larger than the first coil.

12. The coupling area enhancement device of claim 11 wherein the first and second coils are located apart from each other such that when folded the flexible substrate creates a structure with the first and second coils on opposing sides.

13. The coupling area enhancement device of claim 12 further comprising adhesive material formed over the first coil to aid in locating the first coil over a coupling area of a mobile device.

14. The coupling area enhancement device of claim 13 further comprising additional adhesive material formed over the second coil to aid in securing the coupling area enhancement device.

15. The coupling area enhancement device of claim 11 wherein the flexible substrate has EMI absorptive qualities at substantially 13.56 MHz.

16. An apparatus comprising:
    a contactless device with a loop antenna; and
    a coupling area enhancement device having a first coil placed to couple to the loop antenna, a second coil larger than the first coil and coupled to the first coil, and a sheet of electromagnetic interference (EMI) absorptive material between the first and second coils.

17. The apparatus of claim 16 wherein the first coil is electrically coupled to the second coil.

18. The apparatus of claim 16 wherein the first coil is magnetically coupled to the second coil.

19. The apparatus of claim 16 further comprising a memory card, wherein the loop antenna is on the memory card.

20. The apparatus of claim 16 wherein the apparatus comprises a mobile phone.

21. The apparatus of claim 16 wherein the sheet of EMI absorptive material includes at least one hole.

22. The apparatus of claim 21 wherein the at least one hole is aligned to accommodate a mobile phone accessory device.

23. The apparatus of claim 22 wherein the at least one hole is aligned to accommodate one of: a speaker, a camera, or a microphone.

* * * * *